(12) United States Patent
Linzer et al.

(10) Patent No.: US 7,015,918 B2
(45) Date of Patent: Mar. 21, 2006

(54) 2-D LUMA AND CHROMA DMA OPTIMIZED FOR 4 MEMORY BANKS

(75) Inventors: Elliot N. Linzer, Suffern, NY (US); Ho-Ming Leung, Cupertino, CA (US)

(73) Assignee: LSI Logic Corporation, Milpitas, CA (US)

( * ) Notice: Subject to any disclaimer, the term of this patent is extended or adjusted under 35 U.S.C. 154(b) by 123 days.

(21) Appl. No.: 10/458,157

(22) Filed: Jun. 10, 2003

(65) Prior Publication Data

US 2004/0252127 A1 Dec. 16, 2004

(51) Int. Cl.
*G06F 13/00* (2006.01)
*G06F 12/02* (2006.01)

(52) U.S. Cl. .................. 345/537; 345/543; 345/544
(58) Field of Classification Search ............. 345/544, 345/537, 543, 539, 562, 502, 570, 536, 530, 345/501, 535, 531, 589, 591
See application file for complete search history.

(56) References Cited

U.S. PATENT DOCUMENTS

| 4,758,881 A | * | 7/1988 | Laspada ............... 348/560 |
| 5,155,822 A | * | 10/1992 | Doyle et al. .......... 711/202 |
| 5,579,473 A | * | 11/1996 | Schlapp et al. ....... 345/557 |
| 5,872,577 A | * | 2/1999 | Perrin ................. 345/535 |
| 5,920,352 A | * | 7/1999 | Inoue .................. 348/384.1 |
| 6,104,416 A | * | 8/2000 | McGuinness ......... 345/544 |
| 2003/0151609 A1 | * | 8/2003 | Champion ............ 345/571 |

* cited by examiner

*Primary Examiner*—Kee M. Tung
*Assistant Examiner*—Joni Hsu
(74) *Attorney, Agent, or Firm*—Christopher P. Maiorana, P.C.

(57) ABSTRACT

A method for storing data of a plurality of components of an image in a memory system with four banks comprising the steps of (A) placing a first portion of data of a first component of the plurality of components into a first bank of the four banks and (B) placing a second portion of the data of the first component in a second bank of the four banks, where all of the data of the first component is stored in the first and second banks and occupies at least three pages in the memory system.

18 Claims, 8 Drawing Sheets

| 0 | 1 | 0 | 1 | 0 | 1 | 0 | 1 |
|---|---|---|---|---|---|---|---|
| 2 | 3 | 2 | 3 | 2 | 3 | 2 | 3 |
| 0 | 1 | 0 | 1 | 0 | 1 | 0 | 1 |
| 2 | 3 | 2 | 3 | 2 | 3 | 2 | 3 |

ASSIGNMENT OF BANKS TO TILES FOR LUMA WITH 8 BANKS TOTAL

FIG. 3A

| 4 | 5 | 4 | 5 | 4 | 5 | 4 | 5 |
|---|---|---|---|---|---|---|---|
| 6 | 7 | 6 | 7 | 6 | 7 | 6 | 7 |
| 4 | 5 | 4 | 5 | 4 | 5 | 4 | 5 |
| 6 | 7 | 6 | 7 | 6 | 7 | 6 | 7 |

ASSIGNMENT OF BANKS TO TILES FOR CHROMA WITH 8 BANKS TOTAL

FIG. 3B

| 0 | 1 | 0 | 1 | 0 | 1 | 0 | 1 |
|---|---|---|---|---|---|---|---|
| 1 | 0 | 1 | 0 | 1 | 0 | 1 | 0 |
| 0 | 1 | 0 | 1 | 0 | 1 | 0 | 1 |
| 1 | 0 | 1 | 0 | 1 | 0 | 1 | 0 |

ASSIGNMENT OF BANKS TO TILES FOR LUMA WITH FOUR BANKS TOTAL

FIG. 5A

| 2 | 3 | 2 | 3 | 2 | 3 | 2 | 3 |
|---|---|---|---|---|---|---|---|
| 3 | 2 | 3 | 2 | 3 | 2 | 3 | 2 |
| 2 | 3 | 2 | 3 | 2 | 3 | 2 | 3 |
| 3 | 2 | 3 | 2 | 3 | 2 | 3 | 2 |

ASSIGNMENT OF BANKS TO TILES FOR CHROMA WITH FOUR BANKS TOTAL

FIG. 5B

2-D LUMA AND CHROMA DMA OPTIMIZED FOR 4 MEMORY BANKS

CROSS REFERENCE TO RELATED APPLICATION

The present application may relate to co-pending applications Ser. No. 10/306,751, filed Nov. 27, 2002 and Ser. No. 10/306,749, filed Nov. 27, 2002, which are hereby incorporated by reference in their entirety.

FIELD OF THE INVENTION

The present invention relates to image data storage generally and, more particularly, to a method and apparatus for 2-D luma and chroma direct memory access (DMA) optimized for four memory banks.

BACKGROUND OF THE INVENTION

Referring to FIG. 1, an image 40 illustrating a conventional raster approach to a video data storage structure is shown. A 1920 pixels wide by 1080 pixels high image can be stored as 1080 rows of 1920 bytes. A memory page size is, for example, 1024 bytes. Therefore, the rows of the image 40 are spread over a number of pages. One conventional approach to storing the image 40 is to store all of the bytes of the first row (i.e., ROW0) followed by the bytes of each subsequent row (i.e., ROW1, ROW2, etc.). When the image is processed (e.g., compressed or decompressed), 9×9 blocks of the image 40 are operated upon. When loading a 9×9 block stored in the raster format, at least 9, and possibly ten, pages are retrieved.

Referring to FIG. 2, a block diagram of an image 50 illustrating another conventional storage approach. The image 50 is divided into a number of 32×32 pixel tiles 52a–52n. Each of the tiles 52a–52n is stored contiguously as one 1024 byte page. The number of pages transferred per 9×9 block is reduced when compared with the raster storage method of FIG. 1.

A method and/or architecture for 2-D luma and chroma direct memory access (DMA) for video decoders and encoders that uses a smaller number of memory banks would be desirable.

SUMMARY OF THE INVENTION

The present invention concerns a method for storing data of a plurality of components of an image in a memory system with four banks comprising the steps of (A) placing a first portion of data of a first component of the plurality of components into a first bank of the four banks and (B) placing a second portion of the data of the first component in a second bank of the four banks, where all of the data of the first component is stored in the first and second banks and occupies at least three pages in the memory system.

The objects, features and advantages of the present invention include providing a method and apparatus for 2-D luma and chroma DMA optimized for four memory banks that may (i) allow luma and chroma to each use two banks, (ii) associate banks and tiles in a checkerboard fashion, (iii) order luma (or chroma) transfers relative to each other for higher performance, (iv) order chroma transfers relative to luma transfers for higher performance and/or (v) provide a better price/performance tradeoff than conventional solutions.

BRIEF DESCRIPTION OF THE DRAWINGS

These and other objects, features and advantages of the present invention will be apparent from the following detailed description and the appended claims and drawings in which:

FIGS. 3(A–B) are diagrams illustrating example bank to tile assignments for eight memory banks;

FIGS. 5(A–B) are diagrams illustrating example bank to tile assignments for four memory banks;

DETAILED DESCRIPTION OF THE PREFERRED EMBODIMENTS

Referring to FIGS. 3(A and B), block diagrams are shown illustrating example bank to tile assignments for luma and chroma data in a memory system with eight banks. A memory system implementing eight memory banks is described in co-pending application Ser. No. 10/306,749. When transferring data to/from one of the banks, the other banks may be pre-charged. When a large number of transfers are performed with the odd transfers using different banks than the even transfers, even pre-charges may be overlapped with odd transfers and odd pre-charges may be overlapped with even transfers. In another example, luminance data for an image may be stored in a different set of banks from chrominance data for the image (e.g., luminance data may be stored in BANKS 0–3 and chrominance data in BANKS 4–7) so that similar overlapping of precharging and transfers may occur. In such a case, the amount of time for a transfer including pre-charge may be the maximum, rather than the sum, of the pre-charge time and the transfer time.

When eight banks are available, a simple rotating pattern between banks may be used. For example, tiles with luminance (or chrominance) data of an image may be assigned to banks as shown in FIGS. 3(A and B), where the numbers 0–3 represent, for example, BANKS 0–3 for luminance (FIG. 3A) and BANKS 4–7 for chrominance (FIG. 3B). Any luminance or chrominance load that is not bigger than a tile generally touches at most one tile from each bank. Because luminance and chrominance generally use different banks, luminance banks can be pre-charged while loading chrominance data and chrominance banks can be pre-charged while loading luminance data.

In one example, horizontally and vertically adjacent portions (or tiles) of the image generally use different banks. Diagonally adjacent portions also use different banks. Luma and chroma are stored linearly in memory (i.e., the luma component takes up a linear range of addresses as does chroma), so that each of luma and chroma use pages from all four memory banks. A luma transfer may use data from up to four pages, but the data will be from four different memory banks. A chroma transfer may use data from up to four pages, but the data will be from four different memory banks.

In an eight bank system, luma and chroma may be loaded for one motion vector as follows.
1. All needed luma pages are prepared (since they are all from different banks, they can all be prepared at the same time);
2. The luma transfers are executed;
3. All needed chroma pages are prepared (since they are all from different banks, they can all be prepared at the same time);
4. The chroma transfers are executed.

In general, when eight banks are available, preparing (e.g., pre-charging) and data transferring always overlap, even when a block touches four pages. However, the use of eight memory banks adds to the cost and complexity of the memory system.

Figures 1, 2:
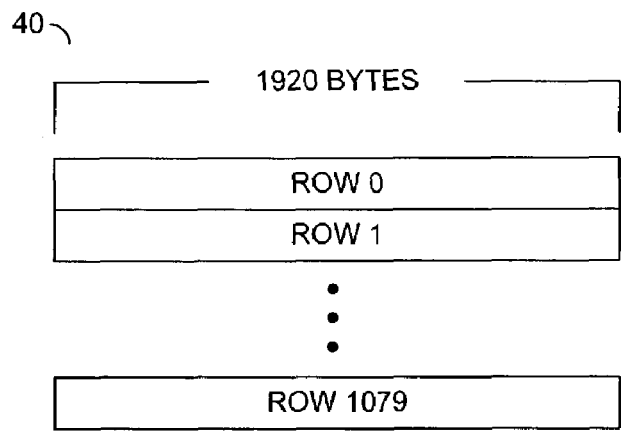
FIG. 1 is a diagram illustrating a conventional raster approach for storing images.
FIG. 2 is a diagram illustrating a conventional tile approach for storing images.
Figure 4:
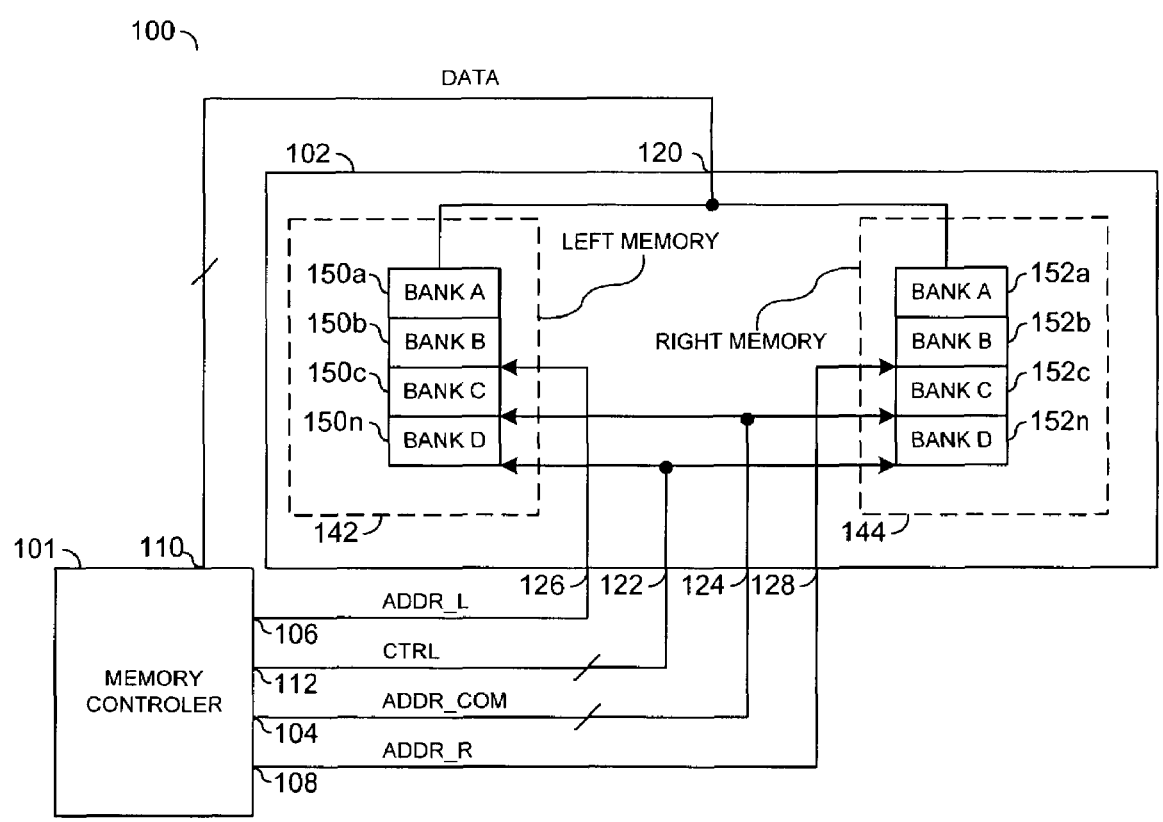
FIG. 4 is a block diagram illustrating a memory system with four memory banks in accordance with a preferred embodiment of the present invention.

Referring to FIG. 4, a system 100 is shown illustrating a memory system in accordance with a preferred embodiment of the present invention. The system 100 generally comprises a memory controller 101 and a memory block (or circuit) 102. The memory block 102 may be implemented, in one example, as a number of memory devices (e.g., 2). The memory controller 101 may have an output 104 that may present a signal (e.g., ADDR_COM), an output 106 that may present a signal (e.g., ADDR_L), an output 108 that may present a signal (e.g., ADDR_R), an input/output 110 that may present/receive a data signal (e.g., DATA), and an output 112 that may present a signal (e.g., CTRL). The signal CTRL may be implemented as one or more control signals. The signal DATA may be implemented as a multi-bit signal. The signal ADDR_COM may comprise one or more common (or shared) address signals. In one example, the signal ADDR_COM may comprise N−1 address signals, where N is an integer. However, other numbers of address signals may be implemented to meet the design criteria of a particular implementation (e.g., N−2). The signal ADDR_L may be implemented as one or more address signals configured to control a portion of the memory 102. The signal ADDR_R may be implemented as one or more address signals configured to control another portion of the memory 102. In general, the signals ADDR_COM, ADDR_L and ADDR_R provide N+1 address signals.

The memory 102 may have an input/output 120 that may receive/present the signal DATA, an input 122 that may receive the signal CTRL, an input 124 that may receive the signal ADDR_COM, an input 126 that may receive the signal ADDR_L and an input 128 that may receive the signal ADDR_R. The memory 102 may be configured to generate the signal DATA in response to the signals CTRL, ADDR_COM, ADDR_L and ADDR_R. The memory 102 may comprise, in one example, a memory 142 and a memory 144. The memory 142 and the memory 144 may each comprise a plurality of banks 150a–n and 152a–n, respectively. In one example, the memories 142 and 144 may be implemented with four banks (e.g., BANK A, BANK B, BANK C, and BANK D).

In one example, each of the memories 142 and 144 may be implemented as a separate memory chip. However, other memory architectures may be implemented accordingly to meet the design criteria of a particular implementation. For example, the memory 102 may be implemented as one 32-bit memory chip or two 16-bit memory chips connected in parallel. Control signals (e.g., R/W/pre-charge) are generally the same for each of the chips making up the memory 102. By connecting the memories 142 and 144 in parallel, the number of banks generally remains the same (e.g., when Bank i is addressed in the memory 142, Bank i in the memory 144 is also addressed). However, the capacity, as well as the number of bytes that may be read per clock cycle, generally doubles.

The memory 102 may be implemented, in one example, as synchronous dynamic random access memory (SDRAM). It may typically take twelve clock cycles to open a page when an SDRAM page is not open. A current page may be pre-charged during a transfer of a previous page if the transfers use different banks. One approach to ensure that transfers use different banks during a motion compensation process is to alternate luminance and chrominance data loads. Once a page is open, data in 2-cycle (e.g., 4-edge) bursts may be used (e.g., when using DDR_II type SDPAM). When the memory 102 is implemented as one 32-bit wide chip, a burst may comprise 16 bytes aligned to a 16 byte boundary. When the memory 102 is implemented with two 16-bit wide chips (e.g., the memories 142 and 144 may be implemented with 16-bit wide memory chips), a burst may comprise 8 bytes aligned to an 8 byte boundary from each of the memory chips. In general, the addressing for both of the memories 142 and 144 is generally the same so that in two cycles a total of 16 bytes, 16 byte aligned may be obtained. In one example, a cycle rate of 200 Mhz may provide approximately 800 clocks per macroblock when decoding an HDTV sequence.

Referring to FIGS. 5(A and B), block diagrams are shown illustrating example bank to tile assignments for luma and chroma data in a memory system with four banks. In a preferred embodiment of the present invention, a memory system may be implemented with four memory banks. When four banks are implemented (e.g., BANKS A–D), luminance and chrominance banks may be associated with tiles in a checkerboard pattern as shown in FIGS. 5(A and B), where the numbers 0 and 1 generally represent, for example, BANKS A and B, respectively, for luminance data (FIG. 5A) and the numbers 2 and 3 generally represent, for example, BANKS C and D, respectively, for chrominance data (FIG. 5B). When the checkerboard pattern in accordance with a preferred embodiment of the present invention is used to associate the four banks with the tiles, vertically and horizontally adjacent tiles (or pages) of the image generally use different banks, while diagonally adjacent tiles (or pages) of the image generally use the same bank.

Figure 6:
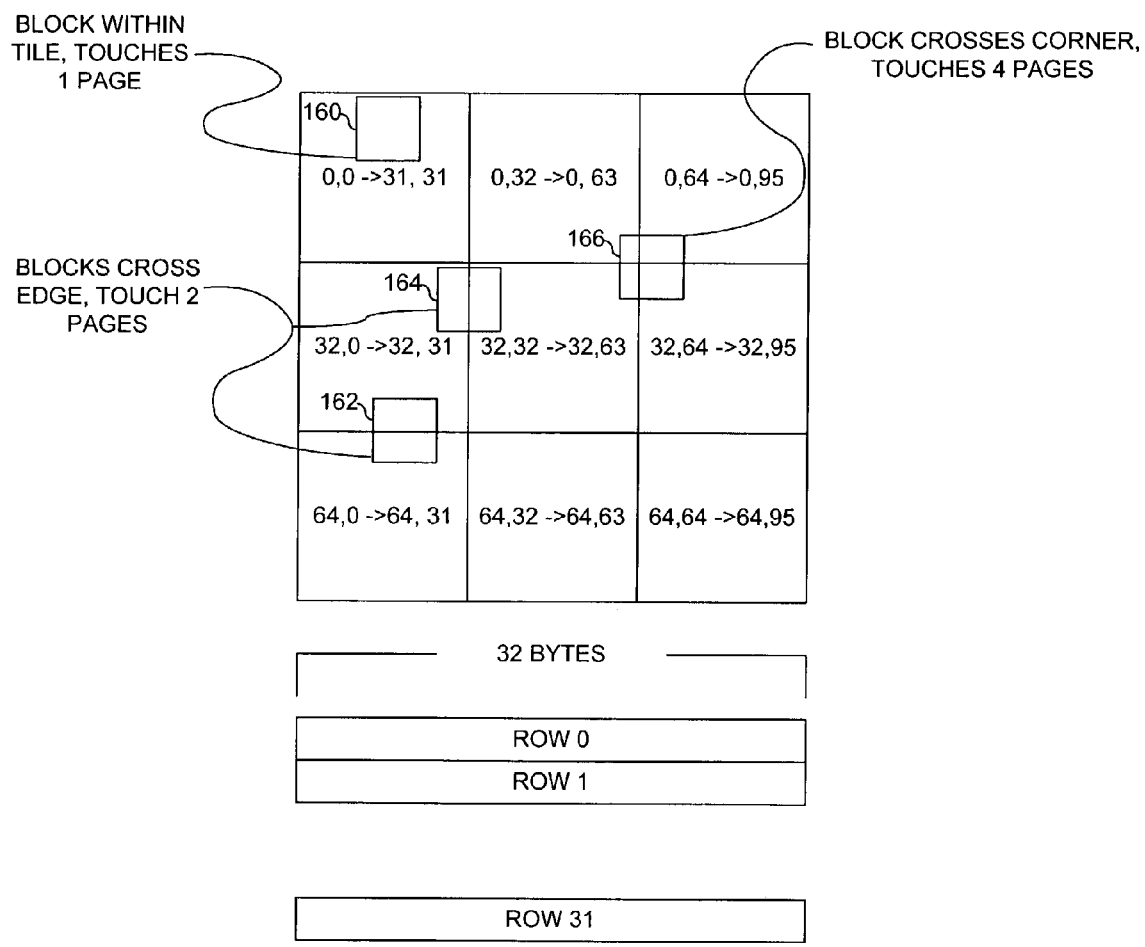
FIG. 6 is a diagram illustrating various luma (or chroma) transfers for motion compensation.

Referring to FIG. 6, a block diagram is shown illustrating example transfers for motion compensation. By storing an image as tiles, a 9×9 (or any size up to 32×32) block 60 may be transferred by retrieving at most 4 pages. Luminance and chrominance data are generally stored separately. In one example, an interlaced image may have each field stored separately. A luma or chroma load that is smaller than one tile generally transfers data from 1–4 tiles (or pages) depending upon the location of the load within the picture.

When the load is in the middle of a tile (e.g., the block 160), the load may be performed by a single transfer from one tile (or page). When the load crosses an edge of a tile (e.g., the blocks 162 and 164), the load is generally performed by a transfer from each of two tiles (or pages). For either of these cases, a luma or chroma load generally transfers data from tiles in unique (different) banks. Since luma and chroma data are in different banks, a preparing operation (e.g., pre-charging) may be overlapped with the loading operation.

A luma or chroma load that crosses a tile corner (e.g., the block 166), generally uses multiple pages from the same bank. Because multiple pages from the same bank are used, overlapping the loading and preparing operations may be more difficult, and the load is generally slower than for the other transfers described above. However, such corner crossings are generally uncommon.

For example, the smallest block size in H.264 is 4×4. The 4×4 block size generally places the greatest burden on motion compensation bandwidth. Because additional pixels are generally used for sub-pixel filtering, a 9×9 block is generally loaded for luma and a 3×3 block is generally loaded for chroma. If, for example, a tile is 32×32 pixels, and a load is 9×9 pixels, the chance of crossing a vertical edge is one-fourth (assuming a uniform distribution of vectors), as is the chance of crossing a horizontal edge. The chance of crossing a corner (i.e., crossing both a horizontal and vertical edge) is one-fourth times one-fourth or one-sixteenth. For a 3×3 load, the chance of crossing a corner is $\frac{1}{16} * \frac{1}{16} = \frac{1}{256}$.

Motion compensation in compliance with the H.264 standard generally takes the most memory cycles when one macroblock uses a large number of motion-compensated loads. For example, when the macroblock is divided into sixteen 4×4 blocks for motion compensation. In such a case, some of the 4×4 blocks may be "slow" due to the crossing of tile corners. However, only in very rare cases will most or even many of the 4×4 blocks cross tile boundaries. Over an entire image, the number of "slow" macroblocks is generally small enough to achieve good performance.

The use of a checkerboard pattern of two banks for each of the luma and chroma data generally decreases, but does not eliminate, the probability that (i) luma loads with chroma prepares or (ii) chroma prepares with luma loads may not be overlapped. In general, loads and prepares may fail to (fully) overlap when (i) a loaded region crosses a tile corner or (ii) a load is fast (e.g., all of the luma or chroma data is loaded in less time than the corresponding prepare time. The present invention generally provides a solution for performing loads that may reduce the occurrence of non-overlapped prepare cycles.

Figure 7:
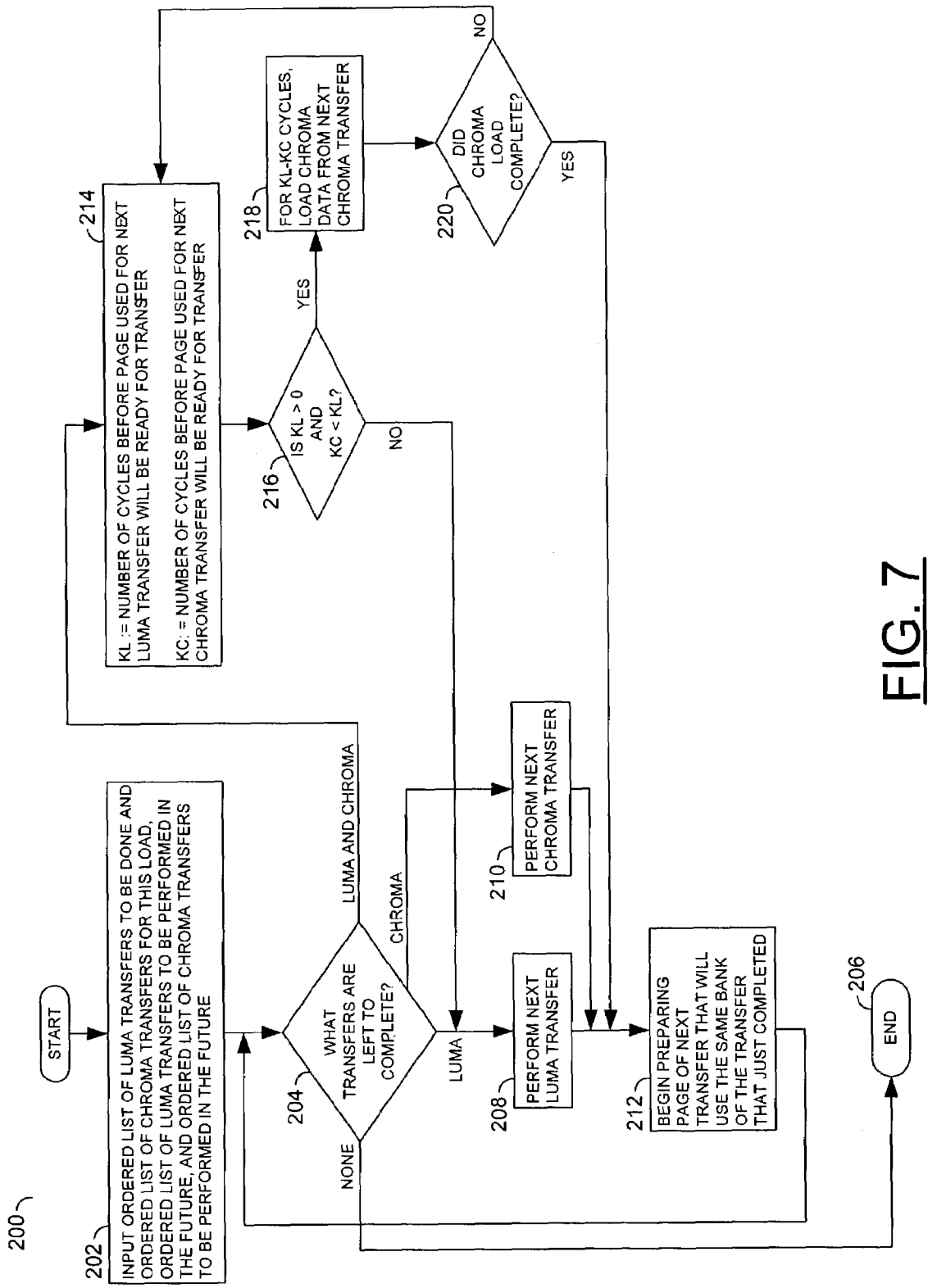
FIG. 7 is a flow diagram illustrating a single load (motion vector) in accordance with a preferred embodiment of the present invention.

Referring to FIG. 7, a flow diagram illustrating a process 200 in accordance with a preferred embodiment of the present invention is shown. In general, the process 200 may be used to execute all transfers associated with a single load (e.g., motion vector). The input to the process 200 generally includes future transfers that are not part of the load. The future transfer information is generally used to determine a next transfer that will use the same bank of the transfer that just completed. The next transfer that will use the same bank may be from the current load or a future load. The luma and chroma transfers that are input to the process 200 are generally already ordered relative to themselves (described in more detail in connection with FIGS. 8 and 9 below).

The process 200 may start by inputting (i) ordered lists of luma transfers to be performed in a current load, (ii) ordered lists of chroma transfers to be performed during the current load, (iii) ordered lists of luma transfers to be performed in a next (or future) load and (iv) ordered lists of chroma transfers to be performed in the next (or future) load (e.g., the block 202). A check is generally performed to determine which transfers are yet to be completed (e.g., the block 204). When no transfers remain to be completed, the process 200 generally ends (e.g., the block 206). When transfers remain to be completed, the process 200 generally moves to one of three paths, depending upon the type of transfers remaining. For example, when only luma or only chroma transfers remain to be completed, the process 200 generally (i) performs the next luma transfer (e.g., the block 208) or the next chroma transfer (e.g., the block 210) and (ii) begins preparing a page of a next transfer that will use the same bank as the transfer that was just completed (e.g., the block 212). The process 200 may again check to determined whether any transfers remain to be completed (e.g., the block 204).

When both luma and chroma transfers remain to be completed, the process 200 generally moves to a block 214. In the block 214, a first variable (e.g., KL) is generally initialized with a value representing the number of cycles before a page used for the next luma transfer will be ready (e.g., prepared, pre-charged, etc.) for transfer and a second variable (e.g., KC) may be initialized with a value representing the number of cycles before a page used for the next chroma transfer will be ready for transfer. If (i) the number of cycles before the next luma page is ready is greater than zero (e.g., KL>0) and (ii) the number of cycles before the next chroma page will be ready for transfer is less than the number of cycles before the next luma page will be ready (e.g., KC<KL), the process 200 generally loads chroma data for the next chroma transfer for the number of cycles (e.g., KL–KC cycles) from when the chroma page is ready until the time when the luma page is ready (e.g., the block 218). If the chroma load is not completed during the KL–KC cycles, the variables KL and KC may be updated (e.g., the block 214) and the process 200 generally loops back to the block 216 (e.g., the NO path from the block 220).

However, when the chroma load is completed during the KL–KC cycles, the process 200 generally begins preparing the page of the next transfer from the same bank as the previous transfer (e.g., the block 212). When the value of KL is not greater than zero (e.g., KL≦0) or the value of the variable KC is not less than the value of the variable KL (e.g., KC≧KL), the process 200 generally performs the next luma transfer (e.g., the NO path from the block 216).

Figure 8:
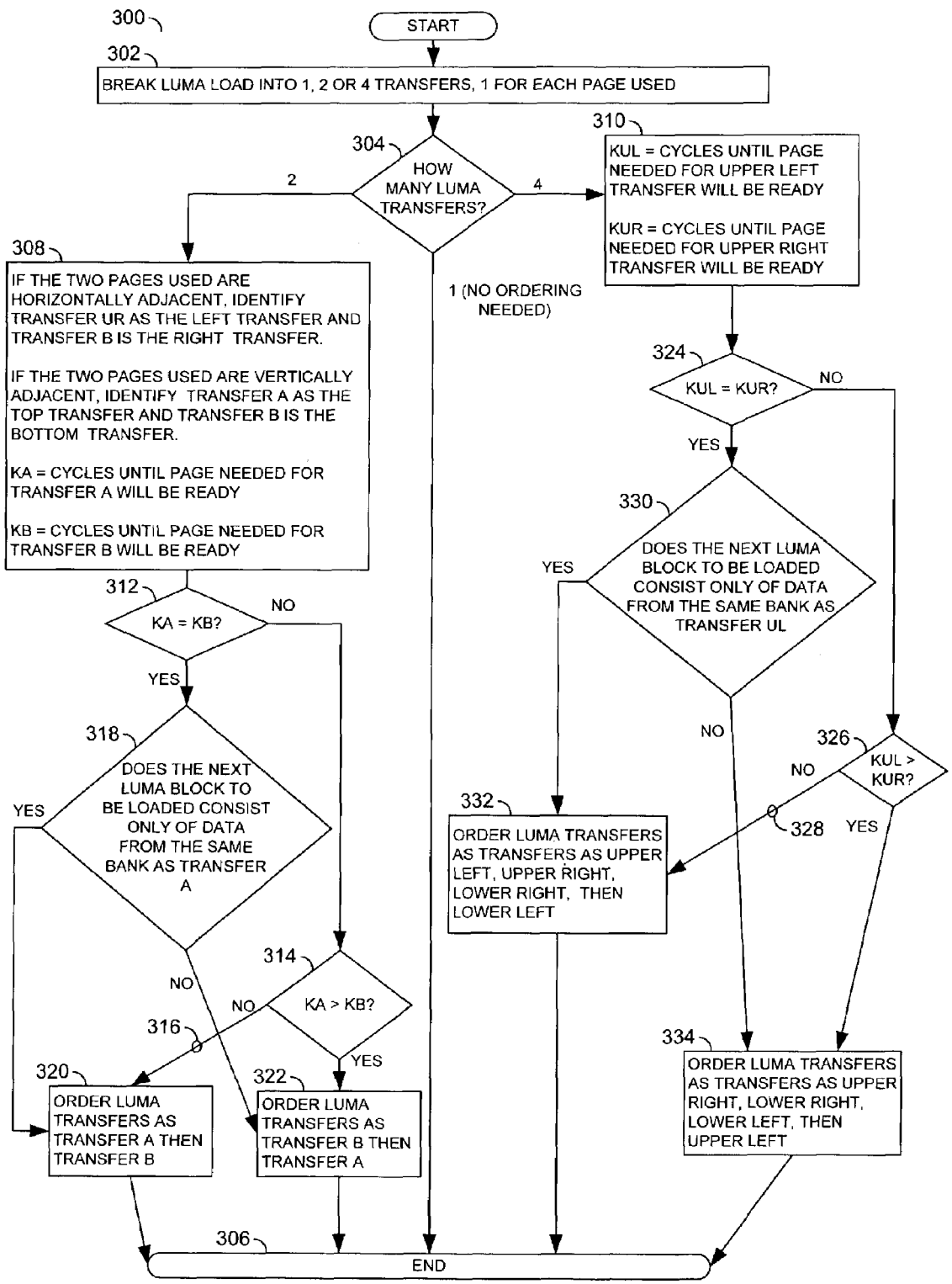
FIG. 8 is a flow diagram illustrating an example process for ordering luminance data transfers in accordance with a preferred embodiment of the present invention.

Referring to FIG. 8, a flow diagram 300 is shown illustrating a process for handling luma data in accordance with a preferred embodiment of the present invention. In general, the process 300 begins by breaking the current luma load into 1, 2 or 4 transfers based upon the number of pages involved (e.g., the block 302). In general, there is one transfer for each page used. The number of transfers to be performed generally determines the order of the transfers (e.g., the block 304). For example, when only one page is to be transferred, ordering is not generally necessary and the process 300 generally moves to an end state 306. When two transfers are to be performed (e.g., two pages), the process 300 generally moves to a state 308. When four transfers are to be performed (e.g., four pages), the process 300 generally moves to a state 310.

In the state 308, the process 300 generally determines whether the two pages to be transferred are horizontally adjacent or vertically adjacent. When the two pages used are horizontally adjacent, a transfer A is generally identified as the left transfer and a transfer B is generally associated with the right transfer. When the two pages used are vertically adjacent, the transfer A is generally identified as the top transfer and the transfer B is generally identified as the bottom transfer. However, other associations may be implemented accordingly to meet the design criteria of a particular implementation. A variable (e.g., KA) may be set to the number of cycles until a page used in the transfer A will be ready. A variable (e.g., KB) may be set to the number of cycles until a page used in the transfer B will be ready. The values of KA and KB are generally compared to determine whether KA is equal to KB (e.g., the block 312), KA is greater than KB (e.g., the block 314) or KB is greater than KA (e.g., the path 316).

When KA equals KB, the process 300 determines whether the next luma block to be loaded consists only of data from the same bank as the transfer A (e.g., the block 318). When the next luma block consists only of data from the same bank as the transfer A, the luma transfers are ordered such that the transfer A occurs prior to the transfer B (e.g., the block 320). When the next luma block does not consist only of data from the same bank as the transfer A, the luma transfers are generally ordered such that the transfer B occurs prior to the transfer A (e.g., the block 322). The process 300 generally moves to an end state (e.g., the block 306) after the transfers are ordered.

When the number of cycles until the page used for the transfer A will be ready is greater than a number of cycles before the page used for the transfer B will be ready (e.g., KA>KB), the luma transfers are generally ordered such that the transfer B is performed prior to the transfer A (e.g., the yes path between blocks 314 and 322). When the number of cycles until the page used for the transfer B to be ready is greater than the number of cycles until the page used for the transfer A will be ready (e.g., KB>KA), the luma transfers are generally ordered such that the transfer A is performed prior to the transfer B (e.g., the no path 316 between the blocks 314 and 320).

When four transfers are to be performed (e.g., upper left, upper right, lower right, lower left pages), a variable (e.g., KUL) may be assigned a value representing the number of cycles until the page used for the upper left transfer will be ready and another variable (e.g., KUR) may be assigned a value representing the number of cycles until the page needed for an upper right transfer will be ready. In the state 310, the process 300 generally selects the two upper pages that are horizontally adjacent. A variable (e.g., KUL) may be set to the number of cycles until a page used for the upper left transfer will be ready. A variable (e.g., KUR) may be set to the number of cycles until a page used for the upper right transfer will be ready. The values of KUL and KUR are generally compared to determine whether KUL is equal to KUR (e.g., the block 324), KUL is greater than KUR (e.g., the block 326) or KUR is greater than KUL (e.g., the path 328).

When KUL equals KUR (e.g., KUL=KUR), the process 300 generally determines whether the next luma block to be loaded consists only of data from the same bank as the upper left transfer (e.g., the block 330). When the next luma block consists only of data from the same bank as the upper left transfer, the luma transfers are generally ordered such that (i) the upper left transfer occurs prior to the upper right transfer, (ii) the upper right transfer occurs prior to the lower right transfer and (iii) the lower right transfer occurs prior to the lower left transfer (e.g., the block 332). When the next luma block does not consist only of data from the same bank as upper left transfer, the luma transfers are generally ordered such that (i) the upper right transfer occurs prior to the lower right transfer, (ii) the lower right transfer occurs prior to the lower left transfer and (iii) the lower left transfer occurs prior to the upper left transfer (e.g., the block 334). The process 300 generally moves to the block 306 after the four transfers are ordered.

When the number of cycles until the page used for the upper left transfer will be ready is greater than the number of cycles before the page used for the upper right transfer will be ready (e.g., KUL>KUR), the luma transfers are generally ordered such that (i) the upper right transfer occurs prior to the lower right transfer, (ii) the lower right transfer occurs prior to the lower left transfer and (iii) the lower left transfer occurs prior to the upper left transfer (e.g., the yes path between blocks 326 and 334). When the number of cycles until the page used for the upper right transfer to be ready is greater than the number of cycles until the page used for the upper left transfer will be ready (e.g., KUR>KUL), the luma transfers are generally ordered such that (i) the upper left transfer occurs prior to the upper right transfer, (ii) the upper right transfer occurs prior to the lower right transfer and (iii) the lower right transfer occurs prior to the lower left transfer (e.g., the no path 328 between the blocks 326 and 332).

Figure 9:
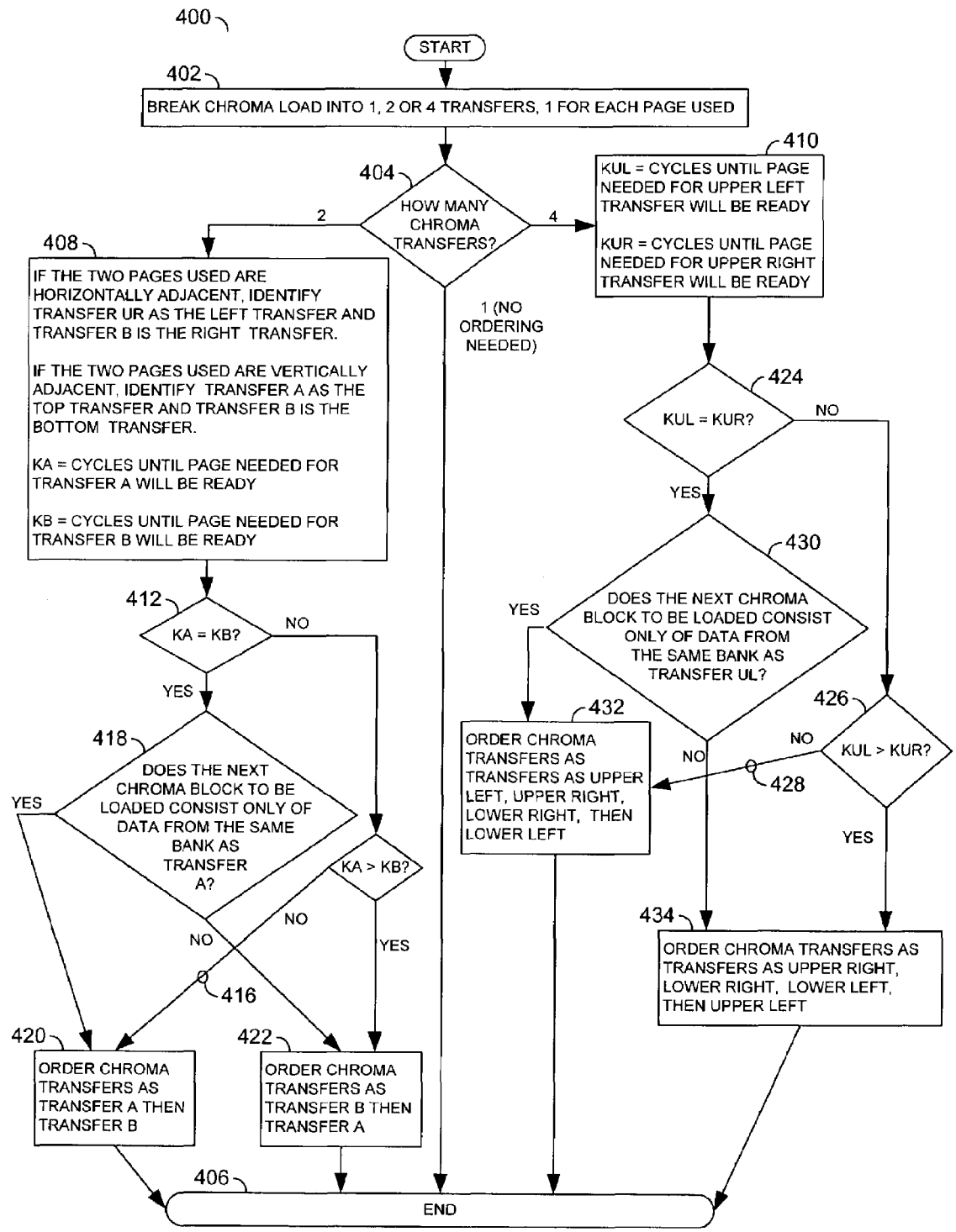
FIG. 9 is a flow diagram illustrating an example process for ordering chroma data transfers in accordance with a preferred embodiment of the present invention.

Referring to FIG. 9, a flow diagram 400 is shown illustrating a process for handling chroma data in accordance with a preferred embodiment of the present invention. The process for handling chroma data is generally similar to the process for luma data. In general, the process 400 begins by breaking the current chroma load into 1, 2 or 4 transfers based upon the number of pages involved (e.g., the block 402). In general, there is one transfer for each page used. The number of transfers to be performed generally determines the order of the transfers (e.g., the block 404). For example, when only one page is to be transferred, ordering is not generally necessary and the process 400 generally moves to an end state 406. When two transfers are to be performed (e.g., two pages), the process 400 generally moves to a state 408. When four transfers are to be performed (e.g., four pages), the process 400 generally moves to a state 410.

In the state 408, the process 400 generally determines whether the two pages to be transferred are horizontally adjacent or vertically adjacent. When the two pages used are horizontally adjacent, a transfer A is generally identified as the left transfer and a transfer B is generally associated with the right transfer. When the two pages used are vertically adjacent, the transfer A is generally identified as the top transfer and the transfer B is generally identified as the bottom transfer. However, other associations may be implemented accordingly to meet the design criteria of a particular implementation. A variable (e.g., KA) may be set to the number of cycles until a page used in the transfer A will be ready. A variable (e.g., KB) may be set to the number of cycles until a page used in the transfer B will be ready. The values of KA and KB are generally compared to determine whether KA is equal to KB (e.g., the block 412), KA is greater than KB (e.g., the block 414) or KB is greater than KA (e.g., the path 416).

When KA equals KB, the process 400 determines whether the next chroma block to be loaded consists only of data from the same bank as the transfer A (e.g., the block 418). When the next chroma block consists only of data from the same bank as the transfer A, the chroma transfers are ordered such that the transfer A occurs prior to the transfer B (e.g., the block 420). When the next chroma block does not consist only of data from the same bank as the transfer A, the chroma transfers are generally ordered such that the transfer B occurs prior to the transfer A (e.g., the block 422). The process 400 generally moves to the end state (or block) 406 after the transfers are ordered.

When the number of cycles until the page used for the transfer A will be ready is greater than a number of cycles before the page used for the transfer B will be ready (e.g., KA>KB), the chroma transfers are generally ordered such that the transfer B is performed prior to the transfer A (e.g., the yes path between blocks 414 and 422). When the number of cycles until the page used for the transfer B to be ready is greater than the number of cycles until the page used for the transfer A will be ready (e.g., KB>KA), the chroma transfers are generally ordered such that the transfer A is performed prior to the transfer B (e.g., the no path 416 between the blocks 414 and 420).

When four transfers are to be performed (e.g., upper left, upper right, lower right, lower left pages), a variable (e.g., KUL) may be assigned a value representing the number of cycles until the page used for the upper left transfer will be ready and another variable (e.g., KUR) may be assigned a value representing the number of cycles until the page needed for an upper right transfer will be ready. In the state 410, the process 400 generally selects the two upper pages that are horizontally adjacent. A variable (e.g., KUL) may be set to the number of cycles until a page used for the upper left transfer will be ready. A variable (e.g., KUR) may be set to the number of cycles until a page used for the upper right transfer will be ready. The values of KUL and KUR are generally compared to determine whether KUL is equal to KUR (e.g., the block 424), KUL is greater than KUR (e.g., the block 426) or KUR is greater than KUL (e.g., the path 428).

When KUL equals KUR (e.g., KUL=KUR), the process 400 generally determines whether the next chroma block to be loaded consists only of data from the same bank as the upper left transfer (e.g., the block 430). When the next chroma block consists only of data from the same bank as the upper left transfer, the chroma transfers are generally ordered such that (i) the upper left transfer occurs prior to the upper right transfer, (ii) the upper right transfer occurs prior to the lower right transfer and (iii) the lower right transfer occurs prior to the lower left transfer (e.g., the block 432). When the next chroma block does not consist only of data from the same bank as upper left transfer, the chroma transfers are generally ordered such that (i) the upper right transfer occurs prior to the lower right transfer, (ii) the lower right transfer occurs prior to the lower left transfer and (iii) the lower left transfer occurs prior to the upper left transfer (e.g., the block 434). The process 400 generally moves to the block 406 after the four transfers are ordered.

When the number of cycles until the page used for the upper left transfer will be ready is greater than the number of cycles before the page used for the upper right transfer will be ready (e.g., KUL>KUR), the chroma transfers are generally ordered such that (i) the upper right transfer occurs prior to the lower right transfer, (ii) the lower right transfer occurs prior to the lower left transfer and (iii) the lower left transfer occurs prior to the upper left transfer (e.g., the yes path between blocks 426 and 434). When the number of cycles until the page used for the upper right transfer to be ready is greater than the number of cycles until the page used for the upper left transfer will be ready (e.g., KUR>KUL), the chroma transfers are generally ordered such that (i) the upper left transfer occurs prior to the upper right transfer, (ii) the upper right transfer occurs prior to the lower right transfer and (iii) the lower right transfer occurs prior to the lower left transfer (e.g., the no path 428 between the blocks 426 and 432).

The present invention generally provides several novel approaches for mitigating prepare (e.g., pre-charge) penalties when only four memory banks are available. Compared to conventional approaches, the present invention may reduce the "worst-case" number of cycles needed for motion compensation. The present invention may also provide a substantial improvement in "typical" performance.

One aspect of the present invention generally provides an immediate prepare operation. In a conventional system, chroma is prepared when loading luma and luma is prepared when loading chroma. In a preferred embodiment of the present invention, improved performance is generally provided by starting a prepare operation earlier than in the conventional system. In particular, after one transfer is finished (e.g., all of the data to be loaded from a page is transferred), a look ahead operation may be performed to determine the next transfer from the same bank. If the next transfer from the same bank uses a different page, the preparation of the page for the next transfer may be started immediately.

The following example generally illustrates an immediate prepare operation. In one example, two loads may be performed with the following parameters: each load uses (or touches) 2 luma tiles (e.g., one from bank 0 and one from bank 1) and uses 12 cycles from each luma tile; each load touches one chroma tile, uses 8 cycles and loads from bank 2; the luma tiles (pages) used in the first load are different from the luma tiles used in the second load; the chroma tiles (pages) used in the first load are different from the chroma tiles used in the second load; a prepare operation takes 12 cycles.

The transfers may be arranged as follows:
1. Luma tile 0, load 1 (6 cycles);
2. Luma tile 1, load 1 (6 cycles);
3. Chroma, load 1 (8 cycles);
4. Luma tile 0, load 2 (6 cycles);
5. Luma tile 1, load 2 (6 cycles);
6. Chroma, load 2 (8 cycles).

If a conventional approach is used, the preparation of banks 0 and 1 is started during step 3 (e.g., the luma is prepared while loading the chroma). Because step 3 takes 8 cycles and the preparation of banks 0 and 1 takes 12 cycles, the convention approach results in a 4-cycle wait between steps 3 and 4. When the immediate prepare technique of the present invention is used, the preparation for step 4 is generally started just after step 1. Because steps 2 and 3 take 14 cycles (e.g., 6+8=14 cycles), which is greater than the prepare time (e.g., 12 cycles), there is generally no wait before performing step 4. Similarly, because steps 3 and 4 take 14 cycles (e.g., 8+6=14 cycles), there is generally no wait introduced before performing step 5. Overall, the immediate preparation method of the present invention generally provides a savings of 4 cycles when compared to the conventional approach.

Another aspect of the present invention generally provides for re-arranging transfers. In one example, each load (e.g., each motion vector) generally transfers from multiple luma tiles and multiple chroma tiles. In the conventional approach, all of the luma transfers for each load are performed first, followed by all of the chroma transfers. Furthermore, in the conventional approach, the loads for luma are arranged geometrically. For example, if the loads are from two horizontally adjacent tiles, the left tile is loaded followed by the right tile. If the loads are from two vertically adjacent tiles, the top tile is loaded followed by the bottom tile. If a load crosses a tile corner, the upper-left tile is loaded first, then the upper-right, then the lower-left, then the lower-right. The conventional chroma loads follow a similar pattern.

In contrast, the present invention generally provides improved performance by (i) arranging the luma transfers relative to each other, (ii) arranging the chroma transfers relative to each other, and/or (iii) arranging the luma transfers relative to the chroma transfers. For example, in a preferred embodiment, the present invention generally provides a number of optimization techniques for ordering the luma transfers relative to each other and the chroma transfers relative to each other and an optimization technique for ordering the chroma transfers relative to the luma transfers.

In one example, the ordering for luma (or chroma) transfers relative to each other may be optimized using one or more of the following techniques:

1. For four transfers (e.g., where a tile corner is crossed), the transfers may be ordered such that the banks used for each transfer alternate (e.g., top left, top right, bottom right, bottom left).
2. When luma (or chroma) transfers begin, if (i) the load involves more than one transfer (e.g., 2 or 4 transfers) and (ii) one page of the load is further along in preparing (e.g., closer to being available) than the other page(s), the "more prepared" page may be transferred first.
3. Same as in 2 above, except that in the case of a tie, the bank used for the current load is determined by the next load. For example, if the next load will use only one bank, the bank that the next load will use goes first for the current load.

The ordering of chroma transfers relative to luma transfers may be optimized by the following technique:

4. A preliminary ordering may be made, for example, with all luma loads before all chroma loads, and the chroma loads advanced as follows: If a luma transfer is about to begin, but the page used by the transfer will take a number of cycles for the prepare operation to complete (e.g., KL>0), and the preparation of the page for the next scheduled chroma transfer will take fewer cycles to complete than the prepare operation for the luma page (e.g., KC<KL), KL–KC cycles worth of chroma loading is generally performed.

To more fully illustrate how each of the optimizations in accordance with the present invention may add to efficiency, examples that use all of the optimizations are presented below. When each optimization is removed, the number of cycles generally increases in at least some cases.

EXAMPLE 1

All banks are already prepared.
A first load comprises:
4 luma transfers:
  Upper-left: bank 0, 6 cycles,
  Upper-right: bank 1, 6 cycles,
  Lower-left: bank 1, 6 cycles,
  Lower-right: bank 0, 6 cycles, and
1 chroma transfer, bank 2, 12 cycles.
A second load comprises:
1 luma transfer, bank 1, 18 cycles; and
1 chroma transfer, bank 2, 12 cycles.

Applying all of the optimizations described above, the order of the loads is generally as follows:
1. Load 1, luma, upper-right, bank 1 (6 cycles);
2. Load 1, luma, lower-right, bank 0 (6 cycles);
3. Load 1, chroma, bank 2, partial transfer (6 cycles);
4. Load 1, luma, lower-left, bank 1, (6 cycles);
5. Load 1, luma, upper-left, bank 0 (6 cycles);
6. Load 1, chroma, remainder of transfer (6 cycles);
7. Load 2, luma bank 1, 18 cycles; and
8. Load 2, chroma bank 2, 12 cycles.

By applying all of the optimizations, there is generally no waiting. Each bank is fully charged (e.g., prepared) when needed.

However, when optimization 1 is not used, but all of the other optimizations are, the ordering may be as follows:
1. Load 1, luma, upper-right, bank 1 (6 cycles);
2. Load 1, chroma, full transfer (12 cycles);
3. Load 1, luma, lower-left, bank 1 (6 cycles);
4. Load 1, luma, lower-right, bank 0 (6 cycles);
5. Wait 12 cycles for bank 0 to prepare;
6. Load 1, luma, upper-left, bank 0 (6 cycles);
7. Load 1, chroma, remainder of transfer (6 cycles);
8. Load 2, luma bank 1, 18 cycles; and
9. Load 2, chroma bank 2, 12 cycles.

Note that in step 2 a full 12 cycles of chroma loading is performed because 12 cycles are taken from when preparation of the needed luma page is started (just after step 1) until the transfer is executed in step 3. Overall, a wait of 12 cycles is introduced without optimization 1, compared with 0 cycles when all optimizations are employed.

In an example where all optimizations are used except for number 3 above, the loads are generally ordered as follows:
1. Load 1, luma, upper-left, bank 0 (6 cycles);
2. Load 1, luma, upper-right, bank 1 (6 cycles);
3. Load 1, chroma, bank 2, partial transfer (6 cycles);
4. Load 1, luma, lower-right, bank 0 (6 cycles);
5. Load 1, luma, lower-left, bank 1 (6 cycles);
6. Load 1, chroma, remainder of transfer (6 cycles);
7. Wait 6 cycles for bank 1 to prepare;
8. Load 2, luma bank 1, 18 cycles; and
9. Load 2, chroma bank 2, 12 cycles.

When rule 3 is violated and the operation starts with bank 0 and ends with bank 1, a wait of 6 cycles is generally introduced for bank 1 to prepare for the second load. Therefore, 6 more cycles are used than if all the optimizations are applied.

In another example, where optimization number 4 is violated in two ways (e.g., all of the luma is done first and then all of the chroma), the loads may be ordered as follows:
1. Load 1, luma, upper-right, bank 1 (6 cycles);
2. Load 1, luma, lower-right, bank 0 (6 cycles);
3. Wait for bank 1 to prepare (6 cycles);
4. Load 1, luma, lower-left, bank 1, (6 cycles);
5. Load 1, luma, upper-left, bank 0 (6 cycles);
6. Load 1, chroma, full transfer (12 cycles);
7. Load 2, luma bank 1 (18 cycles); and
8. Load 2, chroma bank 2 (12 cycles).

In general, a wait of 6 cycles is introduced. In yet another example where rule 2 is violated by doing a complete chroma transfer (instead of a partial transfer) when a luma transfer from bank 1 is about to be done in step 4, the loads may occur as follows:
1. Load 1, luma, upper-right, bank 1 (6 cycles);
2. Load 1, luma, lower-right, bank 0 (6 cycles);
3. Load 1, chroma (12 cycles);
4. Load 1, luma, lower-left, bank 1, (6 cycles);
5. Load 1, luma, upper-left, bank 0 (6 cycles);
6. Wait for bank 1 to prepare (6 cycles);
7. Load 2, luma bank 1 (18 cycles); and
8. Load 2, chroma bank 2 (12 cycles).

Thus, a wait of 6 cycles for the luma load occurs in step 7. In general, advancing part of the chroma transfer is superior to (i) advancing the whole chroma transfer and (ii) not advancing the chroma transfer at all.

In general, for the case presented above in Example 1, the number of cycles used is generally the same whether or not optimization 2 is applied. However, the benefit of optimization 2 may be illustrated by the following Example 2:

EXAMPLE 2

All banks are already prepared.
The first load comprises:
1 luma transfer, bank 0, 18 cycles and
1 chroma transfer, bank 2, 8 cycles.
The second load comprises:
2 luma transfers:
  Left: bank 0, 12 cycles and
  Right: bank 1, 12 cycles; and
1 chroma transfer, bank 2, 8 cycles.

Applying all the optimizations, the loads generally occur as follows:
1. Load 1, luma, bank 0, 18 cycles;
2. Load 1, chroma, bank 2, 8 cycles;
3. Load 2, luma right, bank 1, 12 cycles;
4. Load 2, luma left, bank 0, 12 cycles;
5. Load 2, chroma, bank 2, 8 cycles.

If optimization 2 is eliminated, the loads generally occur as follows:
1. Load 1, luma, bank 0, 18 cycles;
2. Load 1, chroma, bank 2, 8 cycles;
3. Wait 4 cycles for bank 0 to prepare;
4. Load 2, luma left, bank 0, 12 cycles;
5. Load 2, luma right, bank 1, 12 cycles; and
6. Load 2, chroma, bank 2, 8 cycles.

In general, four extra cycles are used when optimization 2 is not applied.

There need not always be rotation between luma loads and chroma loads. For example, chroma data may be smaller than luma data. In such a case, some images may have luma in banks 0 and 1 and chroma in banks 2 and 3; while other images may have luma in banks 2 and 3 and chroma in banks 0 and 1. For example, a 4-bank memory device generally has identical numbers of pages from each of the four banks. When luminance and chrominance data is stored as 4:2:0 format (e.g., chrominance with half the vertical and horizontal resolution as luminance) a chroma component of an image generally uses half the amount of storage as the luminance component of the image. If banks 0 and 1 are always allocated to luma and banks 2 and 3 are always allocated to chroma, the images will generally occupy twice as many pages from banks 0 and 1 as from banks 2 and 3. Such a storage scheme may require the use of a larger memory.

In such a case, the amount of memory used may be reduced by implementing the following storage scheme:
  For half of the number of images stored, use banks 0 and 1 for luma and banks 2 and 3 for chroma;
  For the other half of the number of images stored, use banks 2 and 3 for luma and banks 0 and 1 for chroma.

When such a scheme is used, luma and chroma loads may not always be able to be rotated (e.g., when consecutive loads are from different images). However, because luma and chroma transfers generally occur in pairs, rotation between bank 0/1 loads and bank 2/3 loads may be implemented. For example, instead of loading as luma/chroma/luma/chroma, loads may be ordered as: transfers from banks 0 and 1, transfers from banks 2 and 3, transfers from banks 0 and 1, etc.

While the invention has been particularly shown and described with reference to the preferred embodiments thereof, it will be understood by those skilled in the art that various changes in form and details may be made without departing from the spirit and scope of the invention.

What is claimed is:

1. A method for storing luminance data and chrominance data of an image in a memory system with four banks comprising the steps of:
  placing a first portion of said luminance data into a first bank of the four banks;
  placing a second portion of said luminance data in a second bank of said four banks, wherein all of said luminance data is stored in said first and second banks and occupies at least three pages in said memory system; and
  placing all chrominance data of said image in a third and fourth banks of said four banks, wherein said chrominance data occupies at least three pages in said memory system.

2. The method according to claim 1, further comprising the steps of:
  dividing said image into a plurality of tiles;
  placing luminance data of said tiles in said first bank and said second bank, wherein (i) luminance data of vertically or horizontally adjacent tiles in said image is stored in different banks and (ii) luminance data of diagonally adjacent tiles is stored in the same bank; and
  placing chrominance data of said tiles in said third bank and said fourth bank, wherein (i) chrominance data of vertically or horizontally adjacent tiles is stored in different banks and (ii) chrominance data of diagonally adjacent tiles is stored in the same bank.

3. A method for storing data of a component of at least part of an image in a memory system with four banks, comprising the steps of:
  placing all of the data of a first component of at least part of said image in a first bank and a second bank of the four banks;
  placing all of the data of a second component of at least part of said image in a third bank and a fourth bank of the four banks; and
  placing the data of said first component in at least four pages in said first and said second banks, wherein (i) each of said 4 pages comprises a sub-rectangle of said image, (ii) the data in all four of said pages comprises a contiguous group of sub-rectangles of said image and (iii) said contiguous group of sub-rectangles is larger in both vertical and horizontal dimensions than each of the sub-rectangles forming the contiguous group of sub-rectangles of said image.

4. The method according to claim 3, wherein:
  a first of said four pages comprises data from a first sub-rectangle;
  a second of said four pages comprises data that is from a second sub-rectangle that is horizontally adjacent to said first sub-rectangle;
  a third of said four pages comprises data from a third sub-rectangle that is vertically adjacent to said first sub-rectangle; and
  a fourth of said four pages comprises data from a fourth sub-rectangle that is vertically adjacent to said second sub-rectangle and horizontally adjacent to said third sub-rectangle.

5. The method according to claim 4, wherein the first and third pages are in the same memory bank.

6. The method according to claim 4, wherein the second and fourth pages are in the same memory bank.

7. The method according to claim 6, wherein the first and third pages are in the same memory bank.

8. The method according to claim 3, wherein said first component comprises a luminance component of said image.

9. The method according to claim 3, wherein said first component comprises a chrominance component of said image.

10. The method according to claim 3, wherein said memory system is part of a data path of a video decoder.

11. The method according to claim 3, wherein said memory system is part of a data path of a video encoder.

12. A method for transferring image data from a first device to a second device comprising the steps of:
loading data of a luminance component or a chrominance component of said image from a first page of memory for a current transfer; and
preparing a second page of memory for a next transfer while loading said data from said first page, wherein (i) said memory has four memory banks, (ii) all data of said luminance component is stored in a first bank and a second bank of said four memory banks, (iii) all data of said chrominance component is stored in a third bank and a fourth bank of said four memory banks and (iv) said luminance component and said chrominance component of said image are located in at least 2 different pages.

13. The method according to claim 12, wherein data of a first luminance transfer is loaded from said first page while preparing a second page containing data for a second luminance transfer.

14. The method according to claim 12, wherein data of a first chrominance transfer is loaded from said first page while preparing a second page containing data for a second chrominance transfer.

15. A method for loading a rectangular array of luminance data or chrominance data from a memory system with four banks comprising the steps of:
loading a first sub-rectangle of said rectangular array from a first bank or a third bank of said four banks;
loading a second sub-rectangle of said rectangular array from a second bank or a fourth bank of said four banks;
loading a third sub-rectangle of said rectangular array from the same bank as said first sub-rectangle of said rectangular array; and
loading a fourth sub-rectangle of said rectangular array from the same bank as said second sub-rectangle of said rectangular array, wherein (i) each of said four sub-rectangles is completely contained in a different page, (ii) all of said luminance data is stored in said first bank and said second bank of said four banks and occupies at least three pages in said memory system and (iii) all of said chrominance data is stored in said third bank and said fourth bank of said four banks and occupies at least three pages in said memory system.

16. A method for loading a rectangular array of pixels from a memory device comprising the steps of:
loading at least two sub-rectangles of said rectangular array, wherein (i) each of said at least two sub-rectangles is completely contained in a different page and (ii) each of said at least two sub-rectangles is completely contained in a different memory bank; and
ordering transfers of said at least two sub-rectangles such that (i) when the pages containing said at least two sub-rectangles are not available at the same time, the sub-rectangle in a page that is available for transfer first is loaded first and (ii) when the pages containing said at least two sub-rectangles are available at the same time, the sub-rectangle loaded first is loaded from a memory bank determined by a next load.

17. A method for loading a first rectangular array of pixels and a second rectangular array of pixels from a memory device comprising the steps of:
loading a first sub-rectangle of pixels; and
loading a second sub-rectangle of pixels, wherein said first rectangular array comprises at least two sub-rectangles, each of said at least two sub-rectangles of said first rectangular array is completely contained in a different page, each of said at least two sub-rectangles of said first rectangular array is completely contained in a different memory bank, said second rectangular array is completely contained in a single page, one of said first and said second sub-rectangles is in the same bank as the second rectangular array, and transfers of said first sub-rectangle and said second sub-rectangle are ordered such that the one of said first sub-rectangle and said second sub-rectangle that is in the same bank as the second rectangular array is loaded before the other of said first sub-rectangle and said second sub-rectangle.

18. A method for loading data from a first page in a memory device and a second page in a memory device, wherein the first page is not available for transferring and the second page is available for transferring, comprising the steps of:
loading a first part of the data from the second page until the first page is available;
loading all of the data from the first page when the first page is available; and
loading any remaining data from the second page.

* * * * *